United States Patent [19]

Ritter

[11] Patent Number: 4,638,092

[45] Date of Patent: Jan. 20, 1987

[54] NEW ORGANIC BORON POLYMERS AND THEIR USE

[75] Inventor: Wolfgang Ritter, Düsseldorf, Fed. Rep. of Germany

[73] Assignee: Henkel Kommanditgesellschaft auf Aktien, Düsseldorf, Fed. Rep. of Germany

[21] Appl. No.: 738,902

[22] Filed: May 29, 1985

Related U.S. Application Data

[63] Continuation of Ser. No. 407,886, Aug. 13, 1982, abandoned.

[30] Foreign Application Priority Data

Jan. 21, 1982 [DE] Fed. Rep. of Germany ....... 3201780

[51] Int. Cl.$^4$ .............................................. C07F 5/02
[52] U.S. Cl. ........................................ 568/1; 526/178
[58] Field of Search ......................... 568/1, 3; 526/178

[56] References Cited

U.S. PATENT DOCUMENTS

| | | | |
|---|---|---|---|
| 2,985,633 | 5/1961 | Welch . | |
| 3,066,170 | 11/1962 | Ramsden | 568/3 |
| 3,078,313 | 2/1963 | Brown | 568/1 |
| 3,084,180 | 4/1963 | D'Alelio | 568/3 X |
| 3,084,181 | 4/1963 | D'Alelio | 568/3 X |
| 3,119,878 | 1/1964 | Severini | 568/3 |
| 3,128,212 | 4/1964 | Larchar et al. | 568/3 X |
| 3,129,251 | 4/1964 | Rutkowski | 568/3 X |
| 3,131,224 | 4/1964 | D'Alelio | 568/3 |
| 3,153,661 | 10/1964 | D'Alelio | 568/3 X |
| 3,161,686 | 12/1964 | Brown | 568/1 |
| 3,293,277 | 12/1966 | Convery | 568/3 X |
| 3,476,727 | 11/1969 | Lo Monaco et al. . | |
| 3,633,490 | 1/1972 | Schiffmann . | |
| 4,078,002 | 3/1978 | Brown | 568/1 |
| 4,167,616 | 9/1979 | Bollinger . | |

FOREIGN PATENT DOCUMENTS

| | | | |
|---|---|---|---|
| 2321215 | 11/1973 | Fed. Rep. of Germany . | |
| 874558 | 8/1961 | United Kingdom | 568/3 |
| 1113722 | 5/1968 | United Kingdom . | |

OTHER PUBLICATIONS

Herbert C. Brown, "Organic Synthesis via Boranes", John Wiley and Sons, NY, London, Sydney, Toronto, 1975, pp. 37–50.

Ritter, Wolfgang in Die Makromolekulare Chemie, vol. 178, Huethig & Wepf Verlag, Basel (1977), pp. 2837–2842.

*Primary Examiner*—Helen M. S. Sneed
*Attorney, Agent, or Firm*—Ernest G. Szoke; Nelson Littell, Jr.; Henry E. Millson, Jr.

[57] ABSTRACT

The invention concerns new organo-boron compounds with strong aerobic initiator action to start polymerizations but with improved stability when in contact with atmospheric oxygen. The boron is connected to the molecule predominantly by boron to carbon and optionally boron to hydrogen bonds. The organo-boron compounds are characterized by the fact that the boron containing radicals are connected to an organic polymer matrix that is at least largely nonreactive when exposed to atmospheric oxygen. The boron containing radicals are preferably directly connected to a carbon atom of the polymer matrix by at least one valence of the respective boron atom. The advantageously viscous-fluid to solid masses that are preferably largely free of solvents contain especially hydro-boron radicals and/or organic boron radicals that can have alkyl, cycloalkyl and/or aryl radicals as substituents.

20 Claims, No Drawings

NEW ORGANIC BORON POLYMERS AND THEIR USE

This application is a continuation of application Ser. No. 407,886, filed 8-13-82, now abandoned.

BACKGROUND OF THE INVENTION

Radical polymerizations usually are started by initiators such as peroxides, hydroperoxides or azo compounds. The rate at which the initiator breaks down into radicals depends on the temperature. Conventional radical initiators are stable at room temperature. Depending on their structure, their decomposition into radicals generally is triggered in the temperature range of 60° C., which starts the polymerization. However, a polymerization at low temperatures is also frequently desired. The decomposition of peroxides at room temperature can be obtained with suitable redox systems, for example peroxide/amine. Two components must be metered for the polymerization with this in mind.

It is well-known that boroalkyl compounds can initiate radical polymerizations by themselves at room temperature. In this case the boron compounds are aerobically active initiators, which means that they develop their activity in the presence of oxygen, usually air. The oxygen needed for the activation is practically omnipresent and need not be added separately. Preferred for use are simply trialkyl boron compounds, e.g. triethyl boron or tri-n-butyl boron. The use of trialkyl boron compounds as polymerization initiators is described, e.g., in the U.S. Pat. Nos. 3,476,727; 3,633,490, 2,985,633; and GB-PS No. 1,113,722. In the U.S. Pat. No. 4,167,616 reaction products of butadiene and diborane are described as polymerization starters and respective polymeric reaction products are also described. However, these polymeric boroalkyl compounds are characterized by the fact that at times short segments of C—C bonds are interrupted by, or are linked by B—C units.

Among the essential advantages of the boroalkyl initiators are: The polymerizations take place also at low temperature, the starter system is in single-component form and, finally, the rate of polymerization can be changed by varying the oxygen available.

The simple trialkyl boron compounds, for example triethyl boron or tri-n-butyl boron, but also reaction products of dienes, e.g. butadiene (1,3), pentadiene, (1,3) and others, with diborane have ignition temperatures below 0° C. and ignite spontaneously very readily, please refer to DE-OS No. 23 21 215, for example. They present considerable safety risk during handling, even with extreme precautions. Oxidation to esters of boric acid, which do not initiate polymerizations, occurs as oxygen becomes available. The use and especially the metering of boroalkyls as well as their production process thus require the complete exclusion of oxygen. Actually, the required amount of substance must be stored under inert gas in a completely air tight container. Any seepage of oxygen into the storage container must be prevented.

OBJECTS OF THE INVENTION

It is an object of the invention to provide novel organic boron compounds.

It is another object of the invention to provide organic boron compounds which act as polymerization initiators.

A further object of the invention is to provide organic boron compounds polymerization initiators which are stable in the presence of atmospheric oxygen.

Another object of the invention is to provide organoboron compounds with strong aerobic initiator action for starting a polymerization but with improved stability when exposed to atmospheric oxygen, containing at least a major portion of boron to carbon bonds and if needed, boron to hydrogen bonds in the molecule, wherein the radicals containing boron are bound to an organic polymer matrix and are largely nonreactive when exposed to atmospheric oxygen.

These and other objects of the invention become more apparent as the description thereof proceeds.

DESCRIPTION OF THE INVENTION

The present invention starts with the problem of providing new organic boron compounds that possess the listed advantages of the boroalkyl compounds known so far which especially initiate easily controllable polymerizations upon the addition to monomers by oxidation with atmospheric oxygen. In contrast to the known systems, the new organic boron compounds shall be hardly active with oxygen in their pure form and not at all self-igniting. In the extreme case, the invention is to provide new boroalkyl compounds that are generally stable when stored in air, but still initiate the polymerization spontaneously upon addition to monomers.

The technical solution of the problem according to the invention is based on the surprising observation that a new class of organic boron compounds, which possess characteristics that are improved along desired lines, can be created and isolated by the fixation of boron-containing radicals on a polymer matrix that is at least largely insensitive to the presence of atmospheric oxygen.

The subject of the invention is a primary example consequently of new organic boron compounds with a strong aerobic initiator action for starting a polymerization, but at the same time with improved stability against the presence of atmospheric oxygen, containing at least mainly boron-carbon bonds, and if needed boron-hydrogen bonds, in the molecule, and these new organic boron compounds are characterized by the fact that the radicals containing boron are attached to an organic polymer matrix that is largely stable to the presence of atmospheric oxygen. In the new organic boron compounds, the radicals containing boron usually are bonded directly to a carbon atom of the polymer matrix by at least one valence of the particular boron atom. But it is possible that more than only one boron valence enters into such a bonding state with the polymer matrix.

In another preferred example of the invention, these new organic boron polymers are in the form of viscous fluid to solid masses that are preferably at least largely free of solvents. The new organic boron compounds have major advantages over the conventional boroalkyl initiators: They do not ignite spontaneously and their storage requirements are minimal. The amount needed for the initiation of the polymerization is extremely small, and the polymerization-initiating activity of the mentioned initiators is maintained even during extended storage in air.

In a preferred example of the invention, the new organic boron compounds contain hydroboron radicals and/or organic boron radicals in the polymer matrix that are stable in the presence of air. These boron-containing radicals are bound advantageously to the polymer matrix by B—C bonds. Unless these boron-containing radicals represent the borane radical —$BH_2$ itself, these substituents of the polymer matrix are themselves connected at the boron with at least one additional B—C bond to one or several organic radicals. Preferred radicals are in this case hydrocarbon radicals, which may, however, also contain heteroatoms, especially O, N and/or S. Suitable substituents at the boron are especially alkyl, cycloalkyl, and/or aryl radicals, which may be present in one or, preferably, in both of of the boron valences that are not engaged by the polymer matrix. When such organic radicals differing from hydrogen are present in both boron valences, they, in turn, may be closed to form a ring system. In a different, previously mentioned example of the invention, the boron is attached to the polymer matrix with more than one of its valences. Again in this case, the matrix must be a polymer in the sense of the definition according to the invention that is stable in the presence of atmospheric oxygen prior to the introduction of the radicals containing boron.

The organic boron compounds according to the invention can be obtained simply by the hydroboration of oligomers or polymers containing carbon double bonds that can take part in an addition reaction, which will introduce the boron-containing radicals at least at part of the double bonds that can undergo addition. Suitable for hydroboration are borane as well as mono-or disubstituted boranes, i.e. compounds of the general formula $R_1R_2BH$, in which $R_1$ is an organic radical, preferably a hydrocarbon radical, and $R_2$ is hydrogen or also an organic radical, which can be identical to $R_1$ or different, or which forms a ring system together with $R_1$ and the boron.

Organic boron polymers of the type according to the invention have not been isolated or described as such. Occasional references to their intermediate formation during the synthesis of certain polymer compounds are found in the literature. Reference is made to "Macromol. Chem." 178: 2837–2842, 1977, for example. This contains a description of the study of the synthesis and structure of poly-(1-hydroxytetramethylene) by hydroboration of 1,4-polybutadiene with 9-borabicyclo (3,3,1)-nonane (9-BBN) with immediately following oxidation and hydrolysis of the polymeric organic boron compound formed as an intermediary to produce the hydroxylated hydrocarbon polymer. An isolation of the organic boron polymer forming as an intermediary in the reaction mixture containing solvent was not carried out. Accordingly, no information is given about the boron polymer and especially about its behavior in atmospheric oxygen. The invention is based on the surprising realization that the fixation of the described boron-containing radicals on an oligomer or polymer matrix that is stable in air results in a new type of organic boron compound that distinguishes itself from the previously described boroalkyl compounds that were utilized in special cases for technologically important characteristics. Particularly obvious is the relative stability in air of the organic boron polymers or oligomers described according to the invention, which considerably facilitates their practical handling and use as polymerization initiators.

The polymer matrix that contains ethylenic double bonds and can be hydroborated may range from low-viscosity fluidity to solidity, depending on structure and molecular weight. Its mean molecular weight can reach values of several million and lies usually in the approx. range from 150 to 3 million g/mol. Lower weights within this range may be preferred, for example those in the approx. range from 300 to 500,000 g/mol and especially those in the approx. range from 500 to 10,000 g/mol. For specific purposes it may be desirable that the polymer matrix as well as the organic boron polymers obtained from it are viscous-fluid or spreadable at room temperature. For example, molecular weights for the polymer matrix in the approx. range from 300 to 3,000 may be especially useful. However, this is not a prerequisite for the effectiveness of the organic boron polymers used according to the invention as initiators. On the contrary, the storage stability of respective organic boron polymers that are solids at room temperature may be especially good.

The polymer matrix may have any degree of ethylenic unsaturation before hydroboration. Preferred are respective materials that have an iodine number in the range from approx. 1 to 500 before hydroboration. Especially preferred iodine numbers within this range are approx. 5 to 100 and especially approx. 8 to 50 before hydroboration.

The ethylenic double bonds that can be hydroborated may be located in the main chain of the starting polymer and/or in side-chain substituents. In certain types of polymers, which shall be described later, double bonds suitable for hydroboration are found especially in side-chain substituents.

The polymer matrix may have a straight-chain or branched structure before hydroboration, but polymer materials with cross-linked structure are also suitable. Whereas the first-mentioned types of polymers usually are reacted in solvents for the introduction of boron-containing groups, insoluble cross-linked polymer still containing active double bonds can be used in powdered form for the conversion into the boron-containing matrix. In this case, the insoluble powdered polymer matrix materials are used preferably after soaking in solvents. With these, the reaction can then be carried out in suspension or dispersion in an inert solvent. When more than one of the boron valences link with the polymer matrix during hydroboration, this conversion may result in at least partial crosslinking of the polymeric matrix material through the introduced boron.

Suitable as polymer matrices are basically all polymer types, provided that they have double bonds accessible for hydroboration and no active groups that lead to undesirable side reactions during the introduction of the boron-containing groups into the polymer material.

Within the scope of the invention it is definitely possible that not only ethylenic double bonds are hydroborated during the introduction of boron-containing radicals in the polymer matrix, but that part of the boron-containing reagent also reacts with other functional groups of the polymer matrix. To be mentioned in such groups are, e.g., keto groups, amide groups, epoxide groups and possibly also ester groupings. The only important aspect for observing the teachings of the invention is the hydroboration of an adequate portion of the ethylenic double bonds so that the organic boron radicals with aerobic initiator action are formed to an adequate degree in the polymer matrix.

The polymer material may have been prepared by polymerization or copolymerization of olefinically unsaturated components, by polycondensation or by polyaddition. The desired content of active double bonds in the polymer material for the subsequent hydroboration is guaranteed by the well-known selection of the monomer types from which the polymers are built up. Especially suitable as polymer matrix may be unsaturated oligomers or polymers that were obtained by polycondensates such as polyesters, polyamides, polyimides, polycarbonates, polyurethanes and similar substances. But oligomers or polymer types that are obtained by polyaddition are also suitable.

The oligomers or polymers are prepared preferably by the following methods:

(a) By polymerization of one or several dienes or by copolymerization of such dienes with alpha-olefins.

(b) By polymerization of diolefins that contain different active olefinic groups in the molecule, or by copolymerization of such diolefins with alpha-olefins.

(c) By polymerization of cross-linking agents (olefinically polyunsaturated monomers) or by copolymerization of such cross-linking agents with alpha-olefins.

(d) By polyaddition of cyclic ethers or imines containing olefinic groups.

(e) By polycondensation of dicarboxylic acids containing olefin groups with diols or diamines.

(f) By polycondensation of dicarboxylic acids with diols or diamines containing olefin groups.

The polymerization, polyaddition or polycondensation can be performed with or without regulation of the molecular weight. The formed products are low viscous to solid, depending on the chosen monomer combination and/or regulating condensation. The general expertise of polymer chemistry applies here for the specific case. A list of monomer reactants that can be used for the preparation of the oligomers or polymers containing olefinic groups or used as adjuncts, follows without limiting the invention to the specifically mentioned components.

α-Olefins

Unsubstituted straight-chain and/or branched alpha-olefins with 2 to 25 C-atoms, particularly with 2 to 10 C-atoms, vinyl derivatives such as vinyl esters for example vinyl acetate, vinyl stearate, vinyl benzoate, but also substituted compounds such as vinyl-2-ethylhexoate, vinyl dichloroacetate, vinyl cyanacetate, vinyl-β-butoxy propionate, αmethyl vinyl acetate and others; vinyl ethers, for example vinyl methyl ether, vinyl isobutyl ether, vinyl-n-butyl ether, vinyl cyclohexyl ether; N-vinyl-substituted compounds, for example vinyl pyrrole, vinyl-carbazole, vinyl indole, vinyl imidazole, vinyl diphenylamine, vinylphenyl-α-naphthylamine and others; N-vinyl acid amides, N-vinyl acid imides or N-vinyl lactams, for example vinyl pyrrol lactam, vinyl-3-methylpyrrolidone, vinyl-N-acetylaniline, vinyl succinimide, vinyl-α-imide, vinyl methylacetamide; vinyl pyridine compounds, for example 2-, 3-, or 4-methyl-vinyl pyridine, 5 ethyl-2-vinyl pyridine and others; S-vinyl compounds, especially vinyl substituted sulfides, vinyl thio esters, vinyl sulfoxides and vinyl sulfenes, vinyl halides, for example vinyl chloride, acryl compounds such as acrolein, acrylic acid, acrylic acid derivatives, especially esters or amides of acrylic acid, and acrylonitrile.

DIOLEFINS

Diallyl compounds, for example diallyl sulfide, diallyl phthalate, or diallyl isocyanurate, unsaturated esters of unsaturated monocarboxylic acids and diols or unsaturated amides of unsaturated carboxylic acids and diamines. Examples of unsaturated carboxylic acids are, e.g. acrylic acid, methacrylic acid, crotonic acid or undecylenic acid.

Cyclic Ethers Carrying Olefinic Groups

Suitable are, for example, vinyl-substituted epoxides or correspondingly substituted cyclic ethers with more than 2 vicinal carbon atoms in the ring, glycidyl esters of unsaturated acids such as tetrahydrophthalic acid, diglycidyl ester, or compounds such as vinylcyclohexene epoxide. The polymerization or polyaddition is started by cationically initiated reaction—for example with boron trifluoride or its complex compounds—with the simultaneous opening of the ring ether. The forming oligomers or polymers contain the olefinic compounds for the subsequent reaction with boranes. The iodine number in the oligomer or polymer can be regulated in a well-known manner by copolymerization with cyclic ethers or cyclic imines that lack functionally active olefin groups in the molecule.

Unsaturated Dicarboxylic Acids

Maleic acid, fumaric acid, mesaconic acid, citraconic acid, sorbic acid, alkenylsuccinic acids, for example n-octadecenyl-8-succinic acid and alkenylsuccinic anhydrides, for example n-octadecenyl-8-succinic anhydride.

Unsaturated Diols 2,5-Dimethyl-3-hexen-2,5-diol,2-buten-1,4-diol as well as diols that have an olefinically unsaturated functional group in a side chain substituent. The situation is analogous for unsaturated diamines.

Suitable as saturated dicarboxylic acids, diols or diamines are all known compounds of the mentioned type for example, oxalic acid, malonic acid, succinic acid, azelaic acid, sebacic acid, phthalic acid, hexahydrophthalic acid, terephthalic acid, 2,3-pyridine dicarboxylic acid, 2,3-quinoline dicarboxylic acid, diphenyl-dicarboxylic acid and similar compounds. Examples of saturated diols are ethylene glycol, diethylene glycol, triethylene glycol, 1,4-butanediol, 1,6-hexanediol, 1,10-decanediol and others. Suitable diamines are, for example, ethylenediamine, diethylenetriamine, triethylenetetramine, 1,2-propylenediamine, 1,3-propylenediamine, hexamethylene-diamine, 1,5-diaminopentane, 1,8-diaminooctane, diaminotoluene, 4,4'-diaminodiphenyl methane and comparable diamines.

DIENES

Suitable monomers are 1,3-butadiene, isoprene, chloroprene, 1,3-pentadiene, 2,3-dimethylbutadiene, 1,3-hexadiene or 2,4-hexadiene.

The requirement of stability in atmospheric oxygen at least under normal pressure applies to all oligomers or polymers used within the scope of the invention. They are frequently built up mainly of chains or chain segments with C—C bonds, although this is by no means a prerequisite. Polyformals, for example, are known stable types of polymers with alternating —C—O bonds, which can be modified by suitable means, e.g. with side chain substituents, in which ethylenic double bonds are present for subsequent hydroboration.

The extent of the hydroboration in the polymer matrix can be chosen at will to anywhere within the limits of the total number of double bonds present. However, the conversion of at least a substantial part of these double bonds by introduction of the boron-containing substituents has proved advantageous. In the preferred examples of the invention, for example, at least 30% and preferably at least 50% of ethylenic double bonds originally present in the polymer matrix are hydroborated. Particularly suitable are those organic polymers in which at least 80% preferably at least 90% or even at least 95%, of the ethylenic double bonds were reacted with the boron-containing components. A practically completely hydroborated material frequently is the preferred initiator in the sense of the teachings according to the invention.

Besides borane ($BH_3$), organic borane compounds with one or two organic radicals, especially hydrocarbon radicals, are suitable for the hydroboration. Here, preferred organic radicals are alkyl, cycloalkyl and/or aryl radicals, in which two radicals that may be present can be closed into a ring, with the inclusion of the boron atom. The substituting hydrocarbon radicals are limited especially to 25 C-atoms each. Each of these radicals preferably has not more than approx. 12 to 15 C-atoms.

A particularly suitable class of organic boron compounds for the preparation of the polymeric initiator component are organboron monohydride compounds, especially dialkylmonohydrides. Typical representatives of such boron compounds are, e.g., 9-borabicyclo (3,3,1)-nonane, diisopinocampheyl borane, dicyclohexyl borane, thexylborane-(2,3-dimethyl-2-butylborane), 3,5-dimethyl borinane, diisoamyl borane. The first mentioned of these compounds 9-borabicyclo (3,3,1)-nonane, can be preferred for practical reasons. The compounds above may be prepared for example, from sodium boron hydride and boron trifluoride with suitable olefins or diolefins. Diborane, its ether, amine or sulfide complexes may be used also for their preparation. The general rule applies that the organic boron compounds which have adequate thermal stability at room temperature and are quite resistant to the effect of atmospheric oxygen are preferred for the hydroboration of the polymer matrix.

A compilation of the possible methods for the preparation of suitable boron compounds is found in the monograph by Herbert C. Brown, "Organic Synthesis via Boranes," 1975, John Wiley & Sons, New York.

For the hydroboration, the unsaturated oligomers or polymers are converted by reaction with the chosen hydride compounds, preferably in solvents, with the complete exclusion of oxygen. The known solvents for organic boron compounds, especially tetrahydrofuran or polyethers such as diethylene glycol dimethyl ether, but also esters, hydrocarbon halides and similar substances, are suitable for this purpose.

The organic boron oligomers or polymers according to the invention can then be isolated by drawing off the solvent. Depending on the monomer composition and the molecular weight, they are viscous to solid. They are stored advantageously in closed containers, preferably under inert gas such as nitrogen. These organic boron polymers or oligomers are actually relatively stable in air. Selected compounds may be left standing in an open dish exposed in the air for one day, for example, and still retain an activity for the hardening of olefinic components by polymerization that is practically identical with that of the freshly prepared component or one that was stored protected against oxygen.

The organic boron compounds according to the invention are exceptionally suitable as aerobically active polymerization initiators with largely controllable reactivity. Consequently the invention concerns in an additional example the use of the described new organic boron compounds as polymerization initiators for systems with unsaturated ethylene bonds. Here, the organic boron compounds can be used within the scope of all known types of polymerization. Thus the polymerization can be performed in mass, in solution, in emulsion or suspension for example. The organic boron polymers are brought in contact with at least catalytic quantities of an oxygen source for the intitiation of the polymerization. Pure oxygen or air can be used as the conventional source of oxygen. But the addition of the oxygen in bound form, e.g. in the form of hydroperoxides or peroxides is also possible.

The stability of the new organic boron compounds protected against atmospheric oxygen usually increases with the increasing viscosity of the material. The more viscous the organic boron polymers, the more stable they are generally in atmospheric oxygen. Solid organic boron compounds of the type according to the invention frequently are so stable in contact with atmospheric oxygen that they can be milled while exposed to air. This characteristic is frequently important for their use as polymerization initiators.

In another example, the invention finally concerns the process for the preparation of the new organic boron compounds. For this purpose, the unsaturated oligomeric or polymeric matrix materials are reacted with diborane and/or at least one organic boron compound with complete protection against oxygen. The conversion is carried out to advantage in solvents and can take place at room temperature or only slightly elevated temperatures. Temperatures below room temperature are also suitable. The conversion usually is carried out in the temperature range from minus 40° C. to 100° C. preferably in the temperature range of about 0° to 60° C. The amount of boron-containing reactants to be used is chosen in proportion to the number of reactive places in the polymer matrix that is stable in air so that the desired degree of conversion can take place between the reactants. Possibly present small excess amounts of the boron reactant that do not react with the polymer matrix can be converted by subsequent controlled oxidation reactions to form oxidic boron compounds which do not interfere in that form with the reaction product or its activity.

The following examples are given by way of illustration and not by limitation.

EXAMPLE I (A) Preparation of the Oligomeric or Polymeric Olefins

General Instructions for the Preparation of Polymerization Products

Acrylic acid ester, solvent (tetrahydrofuran-THF), radical starter (azoisobutyric acid nitrile=AIBN) and regulator (thiophenol) were transferred into a refined steel autoclave with stirrer and thermometer and then closed. The autoclave was flushed three times with nitrogen (5 atm.) and 1,3-butadiene was then added to it through a dosing cylinder. The polymerization was carried out at 60±1° C. for 7 hours with stirring. The maximum pressure was 9 atm. The batch was removed from the autoclave and solvent as well as unreacted monomer were separated in a rotary evaporator. The compositions of the batches and the polymer properties are found in Table A (A 1–A4).

General Instructions for the Preparation of Polycondensates

Polyesters

Alkenylsuccinic anhydride (ASA) and diol were placed in a three-neck flask with stirrer and distillation bridge. Under nitrogen the temperature was quickly raised to 150° C. and then from 150° C. to 200° C. in the course of 3 hours.

Polyamides

The amine was placed in a three-neck flask with thermometer, stirrer and distillation bridge. The alkenylsuccinic anhydride (ASA) was added quickly with water cooling, while the reaction temperature was maintained at about 100° C. to keep the ammonium salt liquid. Under nitrogen, the ammonium salt was heated slowly to 200° C. during a period of 2 hours. The largest part of

TABLE A

Summary of the prepared oligomeric and polymeris olefins/polymerization products

| No. | Polymerization batch Amounts of monomer used g | | AIBN g | Thio-phenol | THF g | Mol Butadiene in monomer mixture | Mol Butadiene in polymer[1] | Properties of polymer | Conversion % |
|---|---|---|---|---|---|---|---|---|---|
| A1 | butadiene 21.6 | methyl acrylate 137.8 | 1.6 | 0.92 | 35 | 20 | 38 | highly viscous oil | 20 |
| A2 | butadiene 108 | methyl acrylate 689 | 8.0 | 11.60 | 1400 | 20 | 44 | viscous oil | 17 |
| A3 | butadiene 270 | butyl acrylate 641 | 8.0 | 11.60 | 1700 | 50 | 7.2 | highly viscous oil | 73 |
| A4 | butadiene | butyl acrylate 513 | 4.0 | | 1700 | 20 | 4.2 | very highly viscous oil | 85 |

| No. | Polymerization batch Amount of educt used per gram | | Properties of Polymer | Acid No. | Iodine No. | Mols double bonding/100 g oligomer/polymer |
|---|---|---|---|---|---|---|
| A6 | iso C8—ASA 63.3 | hexamethylene glycol 35.4 | viscous, brownish | 48 | 77.7 | 0.32 |
| A7 | C10—ASA 239 | hexamethylene glycol 118 | viscous, light yellow | 27 | 72.9 | 0.29 |
| A8 | C16—ASA 323 | hexamethylene glycol 118 | slightly viscous brownish | 42 | 55.0 | 0.24 |
| A9 | maleic acid 232.16 | hexamethylene glycol 236 | solid white | 0 | 128 | 0.5 |
| A10 | maleic acid 58.05 adipic acid 292.2 | hexamethylene glycol 292 | solid white | 4.2 | 20 | 0.08 |

| No. | Polymerization batch Amount of educt used per gram | | Properties of polymer | Amine No. | Iodine No. | Mols double-bonding per 100 g oligomer/polymer |
|---|---|---|---|---|---|---|
| A11 | iso C8—ASA 58.5 | trimethylhexa-methylenediamine 43.8 | viscous, brown | 115 | 69.3 | 0.29 |
| A12 | C10—ASA 239 | trimethylhexa-methylenediamine 158 | low viscosity light brown | 115 | 76.2 | 0.26 |
| A13 | C10—ASA 169.7 | trimethylexa-methylenediamine 75.4 | viscous, light brown | 29 | 78.3 | 0.35 |
| A14 | C16—ASA | trimethylexa-methylenediamine 139.9 | low viscosity, brown-green | 98 | 60.7 | 0.22 |
| A15 | C16—ASA 195 | trimethylexa-methylenediamine 67.2 | viscous, brown-green | 31 | 58.3 | 0.29 |

[1] Determination by $^1$H—NMR
ASA = Alkenylsuccinic anhydride

The largest part of the water of reaction, which indicates the progress of the ester condensation, was separated during this time. The batch was allowed to cool to approx. 150° C., a vacuum of 10 torr was cautiously applied and the conversion completed at 200° C. and 10 torr. The product was drained off while hot. The composition of the batches and the polymer properties are found in Table A (A 6–A 10).

the water of reaction, which indicates the formation of amide, separated during this time. The batch was allowed to cool to approx. 150° C. A vacuum of 10 torr was cautiously applied and the amide formation was completed at 200° C. and 10 torr. The product was drained off while hot. The composition of the batches and the oligomer or polymer properties are found in Table A (A 11–A 15).

(B) Preparation of the Oligomeric or Polymeric Boroalkyl Starters the removal of the residual oxygen, the oligoolefins or polyolefins were dissolved in an equal amount degassed of THF and the solvent was removed under a vacuum of $10^{-4}$ torr. In a glovebox, equal parts by weight of freshly distilled, degassed THF were again added, and the oligomeric or polymeric olefins were dissolved. With complete exclusion of oxygen, the amounts of 9-borabicyclo (3,3,1)-nonane (9-BBN) listed in Table B were added, and the mixture was stirred until the 9-BBN was quantitatively dissolved. Then the solution was heated at 60° C. for one hour with stirring. The THF was distilled under vacuum and the storage container was closed. Samples are removed under protective gas and with complete exclusion of oxygen. The compositions and the polymer properties are found in Table B (B1 to B15).

TABLE B

Summary of the prepared oligomeric and polymeric boralkyls

| No. | Olefin used g | 9-BBN g | Degree of modification of the double bond % | Properties |
|---|---|---|---|---|
| B1 | A1/10 | 1.0 | 22 | highly viscous |
| B2 | A2/10 | 1.0 | 18 | viscous |
| B3 | A3/10 | 0.72 | 100 | highly viscous |
| B4 | A4/10 | 0.4 | 100 | thick, viscous |
| B5 | poly-(cis-1,4-butadiene-1,3)[1]/10 | 0.7 | 3 | viscous |
| B6 | A6/50 | 19.5 | 100 | homogeneous, tough, orange |
| B7 | A7/50 | 17 | 100 | homogeneous, highly viscous light yellow |
| B8 | A8/50 | 14.6 | 100 | homogeneous, highly viscous light yellow |
| B9 | A9/50 | 15.4 | 50 | homogeneous, highly viscous red-brown |
| B10 | A10/50 | 4.8 | 100 | powder, light yellow |
| B11 | A11/50 | 17.7 | 100 | homogeneous, solid, orange |
| B12 | A12/50 | 15.8 | 100 | homogeneous, solid, light yellow |
| B13 | A13/50 | 21.4 | 100 | homogeneous, solid, orange |
| B14 | A14/50 | 13.5 | 100 | homogeneous, tough, yellow |
| B15 | A15/50 | 17.7 | 100 | homogeneous, viscous, yellow orange |

[1]Polyol 130 by CWH, Huls

(C) Use of the Oligomeric or Polymeric Boroalkyls as Hardeners for Monomer Adhesives

General Instructions

A stock mixture was prepared as follows: In a glass beaker, 40 g polymethacrylic acid methyl ester (PPMA) commercial powder "Plexigum MB 319" by Rohm, Darmstadt) were dissolved in 45 g methyl methacrylate (MMA) and 5 g methacrylic acid (MAA) with stirring. Between 1.5 and 23 wt% of the oligomeric or polymeric boroalkyl starters described under B (cf. Table B 1 to B 15) were added to similar 5 gram samples of the above mixture with continued vigorous stirring. The pot lives of the mixtures after the addition of a starter vary between 1 and 13 minutes. These adhesives were used to glue sandblasted and degreased sheets of iron together during the pot life and after 24 hours the strengths were measured in the tensile and shear test according to DIN 53 281/3. The results are compiled in Tables C 1 to C 15.

The high stability of the prepared boroalkyl oligomers or polymers in atmospheric oxygen were determined in another test series by storing them in the open container exposed to air for between 24 and 72 hours and using and testing them subsequently as hardeners. The pot lives and tensile and shear strengths of the exposed hardeners are given in parentheses in Tables C 1-C 15.

TABLE C 1

Pot lives and tensile and shear strength on sandblasted and degreased sheet iron test pieces, using the boroalkyl oligomer from Example B 1 to harden methacrylate adhesives (40 g PMMA, 45 MMA, 5 g MAA).

| Hardener concentration wt % | Pot life min. | Tensile and shear strength $\frac{N}{mm^2}$ |
|---|---|---|
| 1.5 | 10 | 19 |
| 3 | 10 | 20 |
| 5 | 5 | 24 |
| 10 | 5 | 12 |
| 23 | 2 | 9 |

TABLE C 2

Pot lives and tensile and shear strengths on sandblasted and degreased sheet iron test pieces, using the boroalkyl oligomer from Example B2 as hardener for methacrylate adhesives (40 g PMMA, 45 g MMA, 5 g MAA).

| Hardener concentration wt % | Pot life min. | Tensile and shear strength $\frac{N}{mm^2}$ |
|---|---|---|
| 1.5 | 10 (12) | 21 (10) |
| 3 | 5 (7) | 25 (24) |
| 5 | 5 (5) | 29 (30) |
| 10 | 5 (5) | 27 (28) |
| 23 | 5 (4) | 13 (24) |

The figures in parentheses indicate the measured data obtained when the boroalkyl hardener was stored exposed to air for 24 hours, at room temperature, before its use.

TABLE C 3

Pot lives and tensile and shear strengths on sandblasted and degreased sheet iron test pieces, using the boroalkyl oligomer from Example B 3 as hardener for methacrylate adhesives (40 g PMMA, 45 g MMA, 5 g MAA).

| Hardener concentration wt % | Pot life min. | Tensile and shear strength $\frac{N}{mm^2}$ |
| --- | --- | --- |
| 1.5 | 8 (11) | 16 (5) |
| 3 | 9 (8) | 27 (14) |
| 5 | 4 (5) | 29 (28) |
| 10 | 3 (4) | 28 (27) |
| 23 | 3 (3) | 26 (24) |

The figures in parentheses indicate the measured data obtained when the boroalkyl hardener was stored exposed to air, at room temperature, 72 hours before its use.

TABLE C 4

Pot lives and tensile and shear strengths on sandblasted and degreased sheet iron test pieces, using the boroalkyl oligomer from Example B 4 as hardener for methacrylate adhesives (40 g PMMA, 45 g MMA, 5 g MAA).

| Hardener concentration wt % | Pot life min. | Tensile and shear strength $\frac{N}{mm^2}$ |
| --- | --- | --- |
| 1.5 | 4 (11) | 0 (0) |
| 3 | 2.5 (11) | 16 (0.4) |
| 5 | 2 (9) | 15 (0.18) |
| 10 | 1.5 (3) | 19 (3.5) |
| 23 | 1.5 (2) | 9 (13) |

The figures in parentheses indicate the data measured when the boroalkyl hardener was stored exposed to air, at room temperature, 24 hours before its use.

TABLE C 5

Pot lives and tensile and shear strengths on sandblasted and degreased sheet iron test pieces, using the boroalkyl oligomer from Example B 5 as hardener for methacrylate adhesives (40 g PMMA, 45 g MMA, 5 g MAA).

| Hardener concentration wt % | Pot life min. | Tensile and shear strength $\frac{N}{mm^2}$ |
| --- | --- | --- |
| 1.5 | 2.5 (8) | 9 (1) |
| 3 | 3 (7) | 18 (8) |
| 5 | 2 (2) | 21 (16) |
| 10 | 2 (2) | 17 (17) |
| 23 | 1 (1) | 2 (3) |

The figures in parentheses indicated the data measured when the boroalkyl hardener was stored exposed to air, at room temperature, 24 hours before its use.

TABLE C 6

Pot lives and tensile and shear strengths on sandblasted and degreased sheet iron test pieces, using the boroalkyl oligomer from Example B 6 as hardener for methacrylate adhesives (40 g PMMA, 45 g MMA, 5 g MAA).

| Hardener concentration wt % | pot life min. | Tensile and shear strength $\frac{N}{mm^2}$ |
| --- | --- | --- |
| 1.5 | 7 | 17 |
| 3 | 5 (6) | 26 (26) |
| 5 | 4 (4.5) | 27 (28) |
| 10 | 3 (4) | 26 (30) |
| 23 | 2.5 (3) | 20 (24) |

The figures in parentheses indicate the data measured when the boroalkyl hardener was stored at room temperature, exposed to air, 48 hours before its use.

TABLE C 7

Pot lives and tensile and shear strengths on sandblasted and degreased sheet iron test pieces, using the boroalkyl oligomer from Example B 7 as hardener for methacrylate adhesives (40 g PMMA, 45 g MMA, 5 g MAA).

| Hardener concentration wt % | pot life min. | Tensile and shear strength $\frac{N}{mm^2}$ |
| --- | --- | --- |
| 1.5 | 6 | 9 |
| 3 | 5 (6) | 23 (21) |
| 5 | 4 (5) | 25 (27) |
| 10 | 4 (4) | 22 (23) |
| 23 | 2.5 (0.5) | 15 (18) |

The figures in parentheses indicate the data measured when the boroalkyl hardener was stored at room temperature exposed to air, 24 hours before its use.

TABLE C 8

Pot lives and tensile and shear strengths on sandblasted and degreased sheet ion test pieces, using the boroalkyl oligomer from Example B 8 as hardener for methacrylate adhesives (40 g PMMA, 45 g MMA, 5 g MAA).

| Hardener concentration wt % | pot life min. | Tensile and shear strength $\frac{N}{mm^2}$ |
| --- | --- | --- |
| 1.5 | 8 | 12 |
| 3 | 6 (8) | 20 (16) |
| 5 | 4 (5.5) | 24 (26) |
| 10 | 3.5 (4) | 21 (24) |
| 23 | 2 (2) | 13 (16) |

The figures in parentheses indicate the data measured when the boroalkyl hardener was stored at room temperature, exposed to air, 48 hours before its use.

TABLE C 9

Pot lives and tensile and shear strengths on sandblasted and degreased sheet iron test pieces, using the boroalkyl oligomer from Example B 9 as hardener for methacrylate adhesives (40 g PMMA, 45 g MMA, 5 g MAA).

| Hardener concentration wt % | pot life min. | Tensile and shear strength $\frac{N}{mm^2}$ |
|---|---|---|
| 1.5 | 12 (9) | 25 (23) |
| 3 | 12 (5.5) | 30 (27) |
| 5 | 11.5 (4.5) | 32 (29) |
| 10 | 8.5 (3.5) | 26 (29) |
| 23 | 5 (3) | 20 (27) |

The figures in parentheses indicate the data measured when the boroalkyl hardener was stored at room temperature, exposed to air, 24 hours before its use.

TABLE C 10

Pot lives and tensile and shear strengths on sandblasted and degreased sheet iron test pieces, using the boroalkyl oligomer from Example B 10 as hardener for methacrylate adhesives (40 g PMMA, 45 g MMA, 5 g MAA).

| Hardener concentration wt % | pot life min. | Tensile and shear strength $\frac{N}{mm^2}$ |
|---|---|---|
| 1.5 | 7 (9.5) | 27 (3) |
| 3 | 6.5 (13.5) | 29 (11) |
| 5 | 6.5 (12) | 28 (24) |
| 10 | 6.5 (11) | 29 (21) |
| 23 | 6 (20) | 27 (1) |

The figures in parentheses indicate the data measured when the boroalkyl hardener was stored at room temperature, exposed to air, 24 hours before its use.

Table C 11

Pot lives and tensile and shear strengths on sandblasted and degreased sheet iron test pieces, using the boroalkyl oligomer from Example B 11 as hardener for methacrylate adhesives (40 g PMMA, 45 g MMA, 5 g MAA).

| Hardener concentration wt % | pot life min. | Tensile and shear strength $\frac{N}{mm^2}$ |
|---|---|---|
| 1.5 | 4 (6) | 17 (17) |
| 3 | 4 (5) | 18 (24) |
| 5 | 3 (5) | 16 (27) |
| 10 | 2 (3) | 8 (21) |
| 23 | 1.5 (2) | 4 (13) |

The figures in parentheses indicate the data measured when the boroalkyl hardener was stored at room temperature, exposed to air, 24 hours before it use.

TABLE C 12

Pot lives and tensile and shear strengths on sandblasted and degreased sheet iron test pieces, using the boroalkyl oligomer from Example B 12 as hardener for methacrylate adhesives (40 g PMMA, 45 g MMA, 5 g MAA).

| Hardener concentration wt % | pot life min. | Tensile and shear strength $\frac{N}{mm^2}$ |
|---|---|---|
| 1.5 | 12 (11) | 14 (13) |
| 3 | 9 (10) | 27 (17) |
| 5 | 7 (5) | 30 (26) |
| 10 | 5 (4) | 26 (23) |
| 23 | 3 (3) | 20 (11) |

The figures in parentheses indicate the data measured when the boroalkyl hardener was stored at room temperature, exposed to air, 24 hours before its use.

TABLE C 13

Pot lives and tensile and shear strengths on sandblasted and degreased sheet iron test pieces, using the boroalkyl oligomer from Example B 13 as hardener for methacylate adhesives (40 g PMMA, 45 g MMA, 5 g MAA).

| Hardener concentration wt % | pot life min. | Tensile and shear strength $\frac{N}{mm^2}$ |
|---|---|---|
| 1.5 | 8 (8) | 20 (20) |
| 3 | 6 (6) | 24 (25) |
| 5 | 5 (5) | 25 (28) |
| 10 | 4 (4) | 18 (20) |
| 23 | 2.5 (2.5) | 1 (12) |

The figures in parentheses indicate the data measured when the boroalkyl hardener was stored at room temperature, exposed to air, 24 hours before its use.

TABLE C 14

Pot lives and tensile and shear strengths on sandblased and degreased sheet iron test pieces, using the boroalkyl oligomer from Example B 14 as hardener for methacrylate adhesives (40 g PMMA, 45 g MMA, 5 g MAA).

| Hardener concentration wt % | pot life min. | Tensile and shear strength $\frac{N}{mm^2}$ |
|---|---|---|
| 1.5 | 8 (12) | 8 (20) |
| 3 | 6 (10) | 15 (18) |
| 5 | 5 (10) | 18 (18) |
| 10 | 3.5 (4) | 17 (16) |
| 23 | 2 (3.5) | 11 (12) |

The figures in parentheses indicate the data measured when the boroalkyl hardener was stored at room temperature exposed to air, 24 hours before its use.

TABLE C 15

Pot lives and tensile and shear strengths on sandblasted and degreased sheet iron test pieces, using the boroalkyl oligomer from Example B 15 as hardener for methacrylate adhesives (40 g PMMA, 45 g MMA, 5 g MAA).

| Hardener concentration wt % | pot life min. | Tensile and shear strength |
|---|---|---|
| 1.5 | 8 (8) | 21 (18) |
| 3 | 5.5 (6) | 24 (28) |
| 5 | 3.5 (4) | 19 (23) |
| 10 | 4.5 (4) | 15 (20) |
| 23 | 2.5 (3) | 3.6 (16) |

The figures in parentheses indicate the data measured when the boroalkyl hardener was stored at room temperature, exposed to air, 24 hours before its use.

with ethanol and dried at 60° C. under vacuum. Yield: 85%.

The experiment was repeated analogously with the starters B 3, B 6 and B 10.

TABLE C16

Tensile and shear strengths after gluing with methacrylate adhesives with the oligomeric Boroalkyl from Example B2 and B3

| Adhesive | | | Hardener | | Glued | Tensile and shear strength $\frac{N}{mm^2}$ |
|---|---|---|---|---|---|---|
| Monomer 1 | Monomer 2 | Polymer | No. | Conc. wt % | material | |
| methyl methacrylate | methacrylic acid | polymethyl methacrylate | B2 | 5 | aluminum | 8 |
| | | | | | beech wood | 3 |
| 45 g | 5 g | 40 g | B3 | 5 | aluminum | 14 |
| triethylene glycol dimethacrylate | methacrylic acid | polymethyl methacrylate | B2 | 3 | iron | 14 |
| | | | | | aluminum | 9 |
| | | | B3 | 3 | iron | 14 |
| 75 g | 5 g | 20 g | | | | |
| diacryl 101 | methacrylic acid | polymethyl methacrylate | B2 | 3 | iron | 10 |
| | | | | aluminum | 11 | |
| 75 g | 5 g | 20 g | B3 | 3 | iron | 10 |
| | | | | | aluminum | |

Aluminum and beech wood test pieces were treated in an identical manner, glued with a simple overlap, and the tensile and shear strengths were determined.

Adhesives based on triethylene glycol dimethacrylate (Diacryl 101, by AKZO chem.) were also polymerized with the hardeners from Examples B 2 and B 3. Sheet iron and aluminum were glued together with the same simple overlap. The results of the tensile and shear strength tests are found in Table C 16. The test pieces were stored for 24 hours at room temperature between gluing and tearing.

D. Polymerization with Oligomeric or Polymeric Boroalkyl Initiators (a) Polymerization in Mass Mixtures of 80 g methyl methacrylate (stabilized with 100 ppm hydroquinone) and 40 g polymethyl mechacrylate each are placed in aluminum beakers exposed to air and mixed with 2.4 g of the starters from Example B. The mixtures gel first and then polymerize to form glass-like, high-strength products.

| Boroalkyl hardener | Time need for gelling | Appearance of polymerization product |
|---|---|---|
| B 2 | 50 min | transparent, glass-like |
| B 3 | 60 | white, glass-like |
| B 5 | >60 | white, glass-like |
| B 6 | 35 | glass-like |
| B 7 | 35 | glass-like |
| B 8 | 30 | glass-like |
| B 9 | 40 | glass-like |
| B 10 | >70 min | glass-like |
| B 11 | 35 | " |
| B 12 | 40 | " |
| B 13 | 40 | " |
| B 14 | 45 | " |
| B 15 | 35 | " |

(b) Precipitation Polymerization

Three grams of starter B 2, which was freshly dissolved in 12 g THF, were added with rapid stirring to a solution of 100 g acrylamide in 200 g ethanol. Turbidity was observed immediately; it quickly increased and changed into a fine precipitate. A precipitate that could not be stirred formed within 30 minutes. The temperature rose concurrently to 50° C. The sample was allowed to stand overnight, was foamed in 700 ml ethanol and filtered with suction. The residue was washed twice with ethanol and dried at 60° C. under vacuum. Yield: 85%.

The experiment was repeated analogously with the starters B 3, B 6 and B 10.

| Starter | Time until solidification of the sample | Yield |
|---|---|---|
| B 3 | 30 min | 48% |
| B 6 | 1 min | 96% |
| B 10 | 30 min | 40% |

(c) Polymerization in Solution

One hundred grams acrylamide were dissolved in 200 g water, and 3 starter B 3, freshly dissolved in 12 g THF, were added with rapid stirring. The aqueous solution turned slightly turbid and, at the same time, a strong increase in the viscosity became apparent within 2 minutes. The temperature rose to 45° C. after 30 minutes, and a solid, gelatinous mass had formed in the reaction vessel after 5 hours. The polymer was diluted with water, precipitated in ethanol, filtered off by suction, washed twice with ethanol and dried.

Yield: 90%

The preceding specific embodiments are illustrative of the practice of the invention. It is to be understood, however, that other expedients known to those skilled in the art or disclosed herein, may be employed without departing from the spirit of the invention or the scope of the appended claims.

I claim:

1. An organo-boron compound having a boron-free polymer matrix having at least one organic polymer chain to which are attached as side chains boron-containing groups in which the boron atoms are attached only to carbon atoms, wherein the boron-containing groups are attached to the polymer matrix through the boron atom, and wherein the boron-containing groups have either two hydrocarbon radicals in which the radicals are the same or different and each radical has up to 25 carbon atoms, or a cyclic hydrocarbon radical having up to 25 carbon atoms each end of which is bound to the boron atom with a boron-carbon bond, said boron-free polymer matrix being largely inert to atmospheric oxygen and having an iodine number from about 1 to about 500 before attachment of the boron-containing groups, said organo-boron compound being in the form of a viscous fluid to a solid mass that is largely free of solvents.

2. An organo-boron compound in accordance with claim 1 wherein said boron-free polymer matrix is either (a) a copolymer of an acrylic acid ester and butadiene, (b) a polyester of alkenylsuccinic acid anhydride with a diol, or (c) a polyamide of alkenylsuccinic acid anhydride with a diamine.

3. An organo-boron compound in accordance with claim 2 wherein the boron-containing groups are 9-borabicyclo (3,3,1)-nonane groups.

4. An organo-boron compound in accordance with claim 2 wherein said polymer matrix containing ethylenic double bonds is prepared by either
   (a) polymerization of one or more dienes or by copolymerization of such diene or dienes with one or more alpha-olefins;
   (b) polymerization of one or more diolefins that contain different active olefinic groups in the molecule, or by copolymerization of such diolefin or diolefins with one or more alpha-olefins;
   (c) polymerization of an olefinically polyunsaturated monomer cross-linking agent or by copolymerization of such cross-linking agent with one or more alpha-olefins;
   (d) polyaddition of cyclic ethers or imines containing olefinic groups;
   (e) polycondensation of dicarboxylic acids containing olefin groups with diols or diamines; or
   (f) polycondensation of dicarboxylic acids with diols or diamines containing olefin groups.

5. An organo-boron compound having a boron-free polymer matrix with at least one organic polymer chain to which are attached as side chains boron-containing groups of the structure $R_1R_2B-$ in which $R_1$ is a hydrocarbon radical having up to 25 carbon atoms and $R_2$) is either hydrogen, a hydrocarbon radical having up to 25 carbon atoms, or together with $R_1$ forms a cyclic hydrocarbon group having up to 25 carbon atoms, each end of which is bound to the boron atom with a boron-carbon bond, said boron-free polymer matrix being largely inert to atmospheric oxygen and having an iodine number of from about 1 to about 500 before attachment of the boron-containing groups, said organo-boron compound being in the form of a viscous fluid to a solid mass that is largely free of solvents.

6. An organo-compound as set forth in claim 1 wherein the hydrocarbon radicals contain up to 12 carbon atoms each.

7. An organo-boron compound as set forth in claim 1 wherein the polymer matrix has a mean molecular weight in the range of from about 150 to about 3,000,000.

8. An organo-boron compound as set forth in claim 1 wherein the polymer matrix has a mean molecular weight in the range of from about 300 to about 500,000.

9. An organo-boron compound as set forth in claim 1 wherein the polymer matrix has a mean molecular weight in the range of from about 500 to about 10,000.

10. An organo-boron compound as set forth in claim 1 wherein the polymer matrix contains oligomers or polymers with ethylenic double bonds, and wherein at least a portion of said double bonds are saturated bonds each having a boron-containing group associated therewith.

11. An organo-boron compound as set forth in claim 1 wherein at least 30% of the ethylenic double bonds present in the polymer matrix before attachment of the boron-containing groups are saturated bonds each having a boron-containing group associated therewith.

12. An organo-boron compound as set forth in claim 1 wherein at least 50% of the ethylenic double bonds present in the polymer matrix before attachment of the boron-containing groups are saturated bonds each having a boron-containing group associated therewith.

13. An organo-boron compound as set forth in claim 1 wherein at least 80% of those ethylenic double bonds present in the polymer matrix before attachment of the boron-containing groups are saturated bonds each having a boron-containing group associated therewith.

14. An organo-boron compound as set forth in claim 1 wherein at least 95% of the ethylenic double bonds present in the polymer matrix before attachment of the boron-containing groups are saturated bonds each having a boron-containing group associated therewith.

15. An organo-boron compound as set forth in claim 1 wherein the polymer matrix is a polymer or copolymer, a polycondensate or a polymer material obtained by poly-addition.

16. An organo-boron compound according to claim 1 wherein the polymer matrix has a straight chain or branched chain structure.

17. An organo-boron compound as set forth in claim 1 wherein the boron-free polymer matrix has an iodine number in the range from about 5 to about 100 before attachment of the boron-containing groups.

18. An organo-boron compound as set forth in claim 1 wherein the boron-free polymer matrix has an iodine number in the range from about 8 to about 50 before attachment of the boron-containing groups.

19. An organo-boron compound as set forth in claim 1 wherein the boron-containing groups are located on any or all of the organic polymer chains of the polymer matrix.

20. The organo-boron compounds of claim 1 wherein said organic polymer containing ethylenic double bonds is prepared by a method selected from the group consisting of
   (a) polymerization of one or several dienes or by copolymerization of such dienes with alpha-olefins;
   (b) polymerization of diolefins that contain different active olefinic groups in the molecule, or by copolymerization of such diolefins with alpha-olefins;
   (c) polymerization of cross-linking agents (olefinically polyunsaturated monomers) or by copolymerization of such cross-linking agents with alpha-olefins;
   (d) polyaddition of cyclic ethers or imines containing olefinic groups;
   (e) polycondensation of dicarboxylic acids containing olefin groups with diols or diamines;
   (f) polycondensation of dicarboxylic acids with diols or diamines containing olefin groups.

* * * * *